United States Patent
Hausmann et al.

(10) Patent No.: US 8,544,742 B2
(45) Date of Patent: Oct. 1, 2013

(54) DEVICE AND METHOD FOR OPERATING A READ/WRITE DEVICE

(75) Inventors: Peter Hausmann, Pfaffhausen (CH); Marcel Plüss, Tann (CH); Peter Plüss, Tann (CH)

(73) Assignee: Legic Idenstsystems AG (CH)

( * ) Notice: Subject to any disclaimer, the term of this patent is extended or adjusted under 35 U.S.C. 154(b) by 366 days.

(21) Appl. No.: 12/444,292

(22) PCT Filed: Oct. 8, 2007

(86) PCT No.: PCT/CH2007/000496
§ 371 (c)(1),
(2), (4) Date: Apr. 24, 2009

(87) PCT Pub. No.: WO2008/043192
PCT Pub. Date: Apr. 17, 2008

(65) Prior Publication Data
US 2010/0025468 A1    Feb. 4, 2010

(30) Foreign Application Priority Data
Oct. 9, 2006    (CH) ........................................ 1611/06

(51) Int. Cl.
*G06K 7/00*    (2006.01)
*G06K 21/06*    (2006.01)

(52) U.S. Cl.
USPC ........................................... 235/439; 235/492

(58) Field of Classification Search
USPC .............. 235/492, 380, 451, 439; 340/572.1, 340/5.53, 539.22; 455/558
See application file for complete search history.

(56) References Cited

U.S. PATENT DOCUMENTS

| | | | |
|---|---|---|---|
| 2002/0003168 A1* | 1/2002 | Takabayashi | 235/492 |
| 2005/0040951 A1* | 2/2005 | Zalewski et al. | 340/572.1 |
| 2005/0189425 A1* | 9/2005 | Itou | 235/492 |
| 2005/0284940 A1* | 12/2005 | Enomoto et al. | 235/451 |
| 2006/0132302 A1* | 6/2006 | Stilp | 340/539.22 |
| 2006/0155913 A1* | 7/2006 | Nishikawa et al. | 340/5.53 |
| 2006/0226243 A1* | 10/2006 | Dariel | 235/492 |
| 2007/0023520 A1* | 2/2007 | Miyashita | 235/451 |
| 2007/0132587 A1* | 6/2007 | Smith et al. | 340/572.1 |
| 2008/0076474 A1* | 3/2008 | Ho | 455/558 |
| 2010/0176202 A1* | 7/2010 | Teraoka et al. | 235/492 |

FOREIGN PATENT DOCUMENTS

| | | |
|---|---|---|
| EP | 0 877 331 A | 11/1998 |
| WO | WO 2004/105157 A2 | 5/2004 |
| WO | WO 2006/074181 | 1/2006 |

OTHER PUBLICATIONS

International Search Report dated Apr. 18, 2008, issued in corresponding international application No. PCT/CH2007/000496.

* cited by examiner

*Primary Examiner* — Thien T Mai
(74) *Attorney, Agent, or Firm* — Ostrolenk Faber LLP (57) ABSTRACT

In an apparatus for operating a read/writer, including an antenna and a read/write unit, for communication with an identification medium via a communication link, a read/writer supply and a read/writer have a breakable connection arranged between them. When there is a contactless (operative) interconnection between the external power supply and the read/writer, the connection between the read/writer supply and the read/writer is open and the read/writer can be operated with the identification medium.

15 Claims, 4 Drawing Sheets

DEVICE AND METHOD FOR OPERATING A READ/WRITE DEVICE

CROSS REFERENCE TO RELATED APPLICATIONS

The present application is a 35 U.S.C. §371 National Phase conversion of PCT/CH2007/000496, filed Oct. 8, 2007, which claims benefit of Swiss Application No. 1611/06, filed Oct. 9, 2006. The PCT International Application was published in the German language.

BACKGROUND

1. Field of the Disclosure

The present invention concerns the field of communication; it relates to an apparatus for operating a read/writer, comprising an antenna and a read/write unit, for communication with an identification medium via a communication link. The invention also relates to a method for operating this apparatus.

2. Related Art

WO2004/105157A2 discloses a method and an apparatus for contactlessly supplying power to an energy storage appliance by means of radio frequency (RF). The apparatus comprises three units: a base station, a reception station with an antenna and an energy storage appliance, which is connected to the reception station. In line with the method disclosed here, the reception station is contactlessly supplied with power by means of the base station, the RF power received via the antenna is converted into a DC voltage and the energy storage appliance is charged.

WO2006/007418A1 describes a first appliance having a first antenna and a first supply and a second appliance having a second antenna and a second supply, where the appliances communicate with one another contactlessly by means of an RF signal. The first or second appliance additionally has a third antenna for communication with a third appliance. The first and/or the second antenna has/have a first and/or a second power drawing component connected to it/them for the purpose of supplying power to the first and/or the second supply. During communication between the two appliances, it is possible to arrange that, by way of example, the first appliance, having a relatively low charge state for the supply, is loaded by virtue of the first power drawing component of the first appliance using the first antenna to draw the power from the RF signal emitted by the second appliance. The drawing of power is initiated by the user, following the communication between the two appliances or at the start of the communication between the two appliances. The power is drawn either in parallel with or sequentially to the communication between the two appliances, for example by virtue of different RF frequencies being used for the communication or the power transmission. The drawing of power by the first appliance may be dependent on approval by the user of the second appliance or on the first appliance, possibly following a request to the second appliance, receiving an unmodulated RF signal from the second appliance which is not used for communication.

The prior art admittedly reveals how wirelessly interconnected appliances which, in a normal operating state, have autonomous or mutually independent interaction with third-party appliances can supply one another with power. At any rate, in the event of a partial or total loss of charge from a storage battery in one of the connected appliances, its storage battery is charged, with partial or complete functionality of the latter appliance also being made possible. The external power supply for the second appliance therefore always accesses the supply unit of the first appliance, charges it and furthermore produces or ensures partial or complete functionality of the second appliance.

By contrast, no account is taken of the fact that not only is it possible for a supply unit for an appliance to have a low or inadequate charge state—in short to have a charge state: storage battery flat—but also there may be an electrical malfunction in a supply unit too. By way of example, the supply unit may be unchargeable or may have a short circuit, an electrical line interruption or another electrical fault (overvoltage or wiring error in the case of direct mains connection). In such cases, too, conventional knowledge according to the state of the art teaches the practice of making an attempt to charge an appliance without evaluating or taking account of the possible consequences (overheating, fire damage, damage to further components). Regardless of these problems, a conventional appliance acts upon an inoperable appliance which is close enough for operative connection by supplying it with charging power and possibly allowing an operating state.

SUMMARY

It is therefore an object of the present invention in respect of the apparatus to develop said apparatus such that, regardless of an appliance's supply of power for autonomous interaction with third-party appliances, said appliance is put into an operating state with said third-party appliances.

The object on which the invention is based for the apparatus is achieved by means of the features of claim 1. Advantageous refinements of the invention for the apparatus are the subject matter of claims 2 to 10.

The essence of the invention can be seen in a breakable connection between a read/writer supply and a read/writer, which connection is open when there is a contactless (operative) interconnection between an external power supply and the read/writer. Even without its own read/writer supply, the externally powered read/writer can now be operated with a third-party appliance, namely an identification medium. In line with the present inventive idea, it is advantageously possible to use a read/writer whose own read/writer supply has a fault or an excessively low charge state, or simply needs to be replaced, at least temporarily, by an external power supply—even if this read/writer supply is fully operable—until the read/writer supply resumes normal operation.

It should be emphasized that, at any time and in any state of a read/writer supply associated with a read/writer, it is therefore possible for the two to be separated from one another and that also the contacts of the read/writer supply are free of any connection to the read/writer. The invention allows for the first time that the read/writer supply is maintained/repaired when it is in a contactless state with respect to the read/writer.

The inventive apparatus allows a defined state of a read/writer supply to be "attained externally", the read/writer being able to accomplish its operation with an identification medium without restriction, for example, without undefined or inadmissible switching states and charging states being able to arise as a result of a conventionally known charging operation.

One advantageous embodiment of the invention provides for an antenna associated with the read/writer to allow the contactless (operative) interconnection with the external power supply. Without departing from the idea of the invention, it is likewise possible to use a dedicated feed antenna, an induction coil or a means for contactless capacitive coupling which provide a contactless interconnection to the external power supply. One advantage of this embodiment is that a feed antenna of this kind or an induction coil of this kind can be detachably connected to the read/writer and hence is used only when needed.

Advantageously, the read/writer supply and the read/write unit have a switching device arranged between them with an "On" switch position and an "Off" switch position, wherein the read/writer supply is connectionless in the "Off" switch position (12) and the read/writer can be put into operation by means of an external power supply independently of the dedicated read/writer supply.

Further advantages of the invention can be found in further claims which are dependent on claim 1; these are acknowledged in the description which follows.

It is also an object of the present invention in respect of the method to develop said method such that said read/writer is put into an operating state with third-party appliances, regardless of a read/writer's associated read/writer supply for autonomous interaction with said third-party appliances.

The object on which the invention is based for the method is achieved by means of the features of claim 11. Features for the method which develop the inventive idea are the subject matter of claims 12 to 20.

The essence of the invention for the method is that a read/writer supply and a read/writer are isolated from one another while an external power supply is interconnected in a contactless way to the read/writer, which power supply supplies the read/writer for the purpose of communication with an identification medium and effects this communication independently of the read/writer supply. The lack of dependence of the read/writer on the read/writer supply is important when the latter has restricted operability, is temporarily inoperable and/or is inoperable.

Advantageously, one embodiment of the invention provides for the isolation of the read/writer supply by means of a switching device to be switched by the external power supply itself.

All other features developing the inventive concept are the subject matter of dependent claims 12 to 20, which are acknowledged in the description which follows.

The text below explains the invention by way of example with reference to the drawing, without restricting the inventive idea to the variant embodiments shown. Identical reference numbers in the figures denote the same items. In the drawing:

DETAILED DESCRIPTION OF THE EMBODIMENTS

Figure 1:
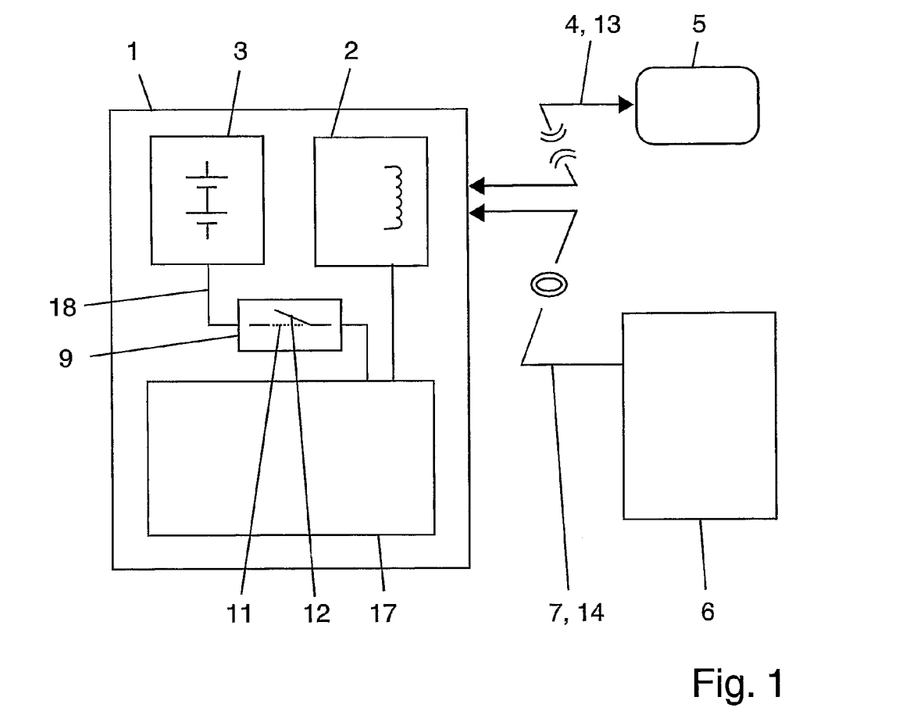
FIG. 1 shows a block diagram of an inventive apparatus for operating a read/writer.

FIG. 1 shows a block diagram of an inventive apparatus for operating a read/writer 1 which comprises a read/write unit 17, an antenna 18, a read/writer supply 3, a connection 18 between the read/write unit 17 and the read/writer supply 3 and a switching device 9 with an "On" switch position 11 and an "Off" switch position 12. The switching device 9 is interposed between the read/write unit 17 and the read/writer supply 3. The antenna 2 is connected to the read/write unit 17.

In addition, an identification medium 5 and an external power supply 6 are shown. The identification medium 5 has a possible contactless communication link 4 to the read/writer 1, said link being operated at a communication frequency f1, 13. The external power supply 6 exhibits a contactless interconnection 7 at a supply frequency f2, 14.

Figure 2:
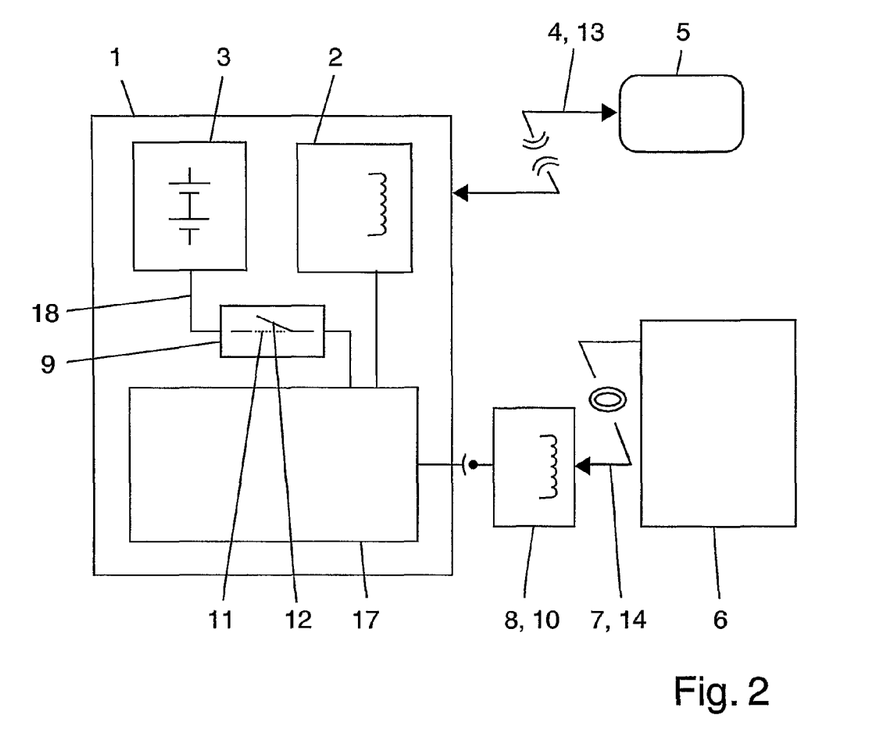
FIG. 2 shows a further block diagram of the inventive apparatus.

FIG. 2 shows a block diagram of an alternative apparatus for operating a read/writer 1 in accordance with the invention. This variant embodiment differs from the one shown in FIG. 1 by virtue of detachable coupling of a further transmission unit 8, 10, namely a feed antenna 8 or an induction coil 10. In this case, the contactless interconnection 7 of the external power supply 6 is provided selectively by means of one of the two aforementioned transmission units 8, 10.

Figure 3:
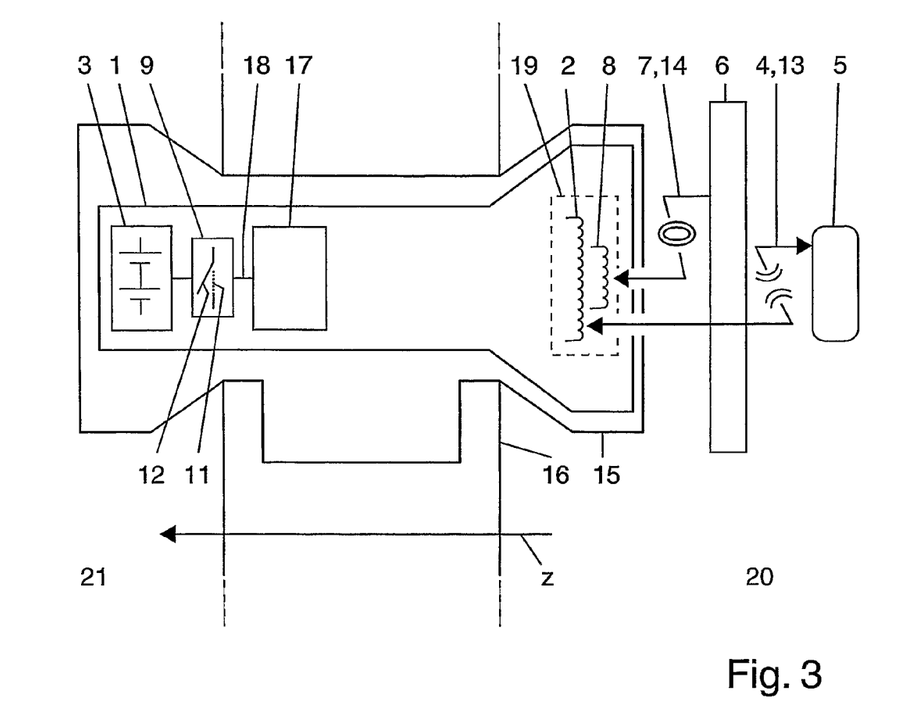
FIG. 3 shows a sectional view of a closing apparatus with the inventive apparatus.

FIG. 3 shows a sectional illustration of a closing apparatus 15 for an openable door 16 with a direction of entry Z. The closing apparatus 15 comprises a read/writer 1 with a read/write unit 17, an antenna 2, a read/writer supply 3, a feed antenna 8 and a switching device 9 for a connection 18 with an "On" switch position 11 and an "Off" switch position 12. The antenna 2 and the feed antenna 8 are in the form of an one-piece antenna unit 19. Furthermore, an identification medium 5, a contactless communication link 4 at a communication frequency f1, 13, an external power supply 6 and a contactless interconnection 7 at a supply frequency f2, 14 are shown.

Figure 4:
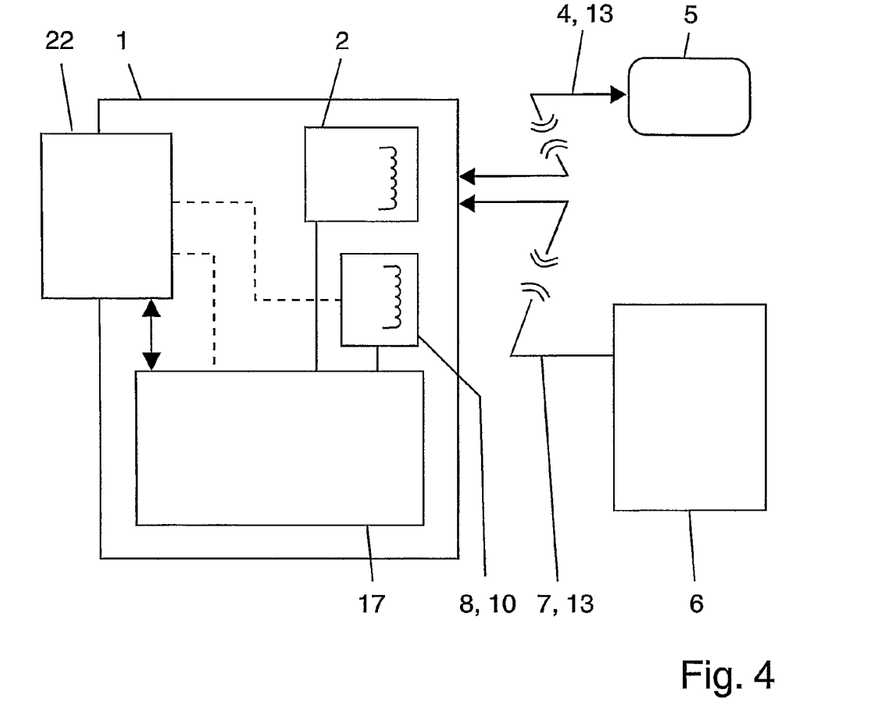
FIG. 4 shows a further block diagram of the inventive apparatus with a load.

FIG. 4 shows a block diagram of a further variant embodiment of the inventive apparatus for operating a read/writer 1. The read/writer 1 has an antenna 2 and a feed antenna 8. The communication link 4 and the contactless interconnection 7 are provided at the same frequency f1, 13. The read/writer 1 has a load 22 which, in an emergency supply mode, is connected either directly to the feed antenna 8 or to the read/write unit 17 (respective dashed line). Between the load 22 and the read/write unit 17 there is a logical connection for controlling the load 22 and/or for communication between the load 22 and the read/write unit 17 (solid line with arrows at both ends). To simplify matters, FIG. 4 does not show the read/writer supply 3 and the breakable connection 18.

FIGS. 1 to 4 show that in the proper operating state the read/writer 1 uses the read/write unit 17 to communicate with the identification medium 5 via the communication link 4 when said identification medium is close to the antenna 2 of the read/writer 5. The communication takes place at a communication frequency f1, 13, preferably in the range above 10 MHz, particularly at the standard frequency of 13.56 MHz. In this context, an identification medium 5 without an autonomous supply (passive identification medium) draws the power for the communication from the or via the communication link 4 from the read/writer 1 (active read/writer).

If the read/writer supply 3 supplies inadequate power to the read/writer 1, the read/writer 1 or the read/write unit 17 changes to an inoperable state. An inoperable state arises, by way of example, as a result of failure of the mains supply or a drop in a storage-battery or battery voltage below an energy state which is necessary for operation of the read/writer 1. In the inoperable state, the read/writer 1 is no longer able to communicate with the identification medium 5.

An external power supply 6, which undergoes unidirectional, contactless interconnection 7 to the read/writer 1, transfers the read/writer 1 from the inoperable state to a temporary operational state (emergency mode). The external power supply 6 supplies power to the read/writer by virtue of the read/writer 1 or the read/write unit 17 drawing the power required for maintaining the operating state via the antenna 2 of the contactless interconnection 7, as shown in FIG. 1. The read/writer 1 is supplied with power directly and immediately, without any communication between the read/writer 1 and the external power supply 6, as soon as and/or for as long as the unidirectional, contactless interconnection 7 is applied to the read/writer 1. In emergency mode, i.e. while there is the contactless interconnection 7 to the external power supply 6, the read/writer 1 can communicate with the identification medium 5. For the communication or the communication link 4, there is no difference between the proper operating state and the temporary emergency mode for the identification medium 5, even as a passive identification medium.

In emergency mode, the read/writer supply 3 is disconnected from the read/write unit 17 by means of a switching device 9. With the contactless interconnection 7 between the external power supply 6 and the read/writer 1, the switching device 9 is switched to the "Off" switch position 12 so that the external power supply 6 does not supply power to the read/writer supply 3 instead of the read/write unit 17, but rather the contactlessly supplied power from the external power supply 6 is used entirely for the emergency mode of the read/writer 1. In contrast to the conventional apparatuses for externally supplying power to read/writers in which the externally supplied power is provided primarily as charging power for an associated read/writer supply, the apparatus according to the invention requires a significantly smaller, supplied amount of power for the exclusive emergency mode described above. Furthermore, the apparatus according to the invention can be operated even if a read/writer supply 3 has a significant electrical fault, such as a short circuit. Unlike in the case of conventional apparatuses, the novel apparatus does not have the risk of supplying power to a short circuit, which can result in relatively major breakdowns.

As soon as the contactless interconnection 7 is broken, the switching device 9 switches from the "Off" switch state 12 to the "On" on state 11 and the connection 18 between the read/write unit 17 and the read/writer supply 3 is restored.

The breakable connection 18 between the read/write unit 17 and the read/writer supply 3 can be implemented by a MOSFET in combination with a diode, for example.

The breakable connection 18 between the read/writer supply 3 and the read/write unit 17 remains in the closed state, i.e. the connection 18 is not opened, when the read/writer 1 is in the inoperable state. When the contactless interconnection 7 and the external power supply 6 are present, the read/writer 1 or the read/write unit 17 is put into an operating state and in this case the breakable connection 18 is opened. The switching operation for the breakable connection 18 is in a manner of speaking initiated or triggered by the presence of the contactless interconnection 7 to the external power supply 6.

In FIG. 2 and FIG. 3, the external interconnection 7 is provided by means of an additional transmission unit, for example a feed antenna 8 or an induction coil 10, which is independent of the antenna 2 associated with the communication link 4. The transmission unit is detachable in FIG. 2 and is connected to the read/writer 1 before the read/writer 1 is supplied with power by means of the external power supply 6.

In FIG. 3, the antenna 2 and the feed antenna 8 form the antenna unit 19. The antenna unit 19 is in the form of an integral printed circuit board—not shown in more detail here—with separate turns and taps or connections on the antenna 2 and the feed antenna 8. By way of example, the antenna 2 is situated inside the feed antenna 8 (largest diameter of the outermost turn of the antenna 2 smaller than the smallest diameter of the innermost turn of the feed antenna 8), or vice versa.

The contactless interconnection 7 is provided at a supply frequency f2, 14. The supply frequency f2, 14 may correspond exactly and approximately to the communication frequency f1, 13 or may differ therefrom. With a supply frequency f2, 14 of greater than 20 MHz, this is preferably a multiple of the communication frequency f1, 13, for example 27.12 MHz or 40.68 MHz. With a supply frequency f2, 14 of less than 10 MHz, the communication frequency f1, 13 is preferably a multiple of the supply frequency f2, 14, for example of 6.78 MHz.

The choice of different frequencies for the communication and the supply simplifies the communication link 4 between the read/writer 1 and the identification medium 5 when there is a simultaneous contactless interconnection 7 or supply of power to the read/writer 1 by the external power supply 6, respectively.

In an very simple design as a portable handset—not shown here—the external power supply 6 comprises a third antenna for contactless interconnection to the antenna 2 or feed antenna 8 of the read/writer 1 or comprises a second induction coil for interconnection to the induction coil 10, a handset supply and operator control elements.

In emergency mode, by way of example the contactless interconnection 7 at the supply frequency f2, 14 is rectified by means of diodes to produce a DC-like voltage and reduced such that the latter is used to supply power directly to the read/write unit 17 and to operate the read/writer 1. This rectification and reduction can also take place in a separate circuit connected upstream of the read/write unit 17.

FIG. 4 shows the supply and the operation of the load 22 in emergency mode when the read/writer 1 has a contactless interconnection 7 to the external power supply 6. It is likewise possible for a plurality of loads to be supplied. In this case, the supply is provided either directly via the supply antenna 8 or indirectly via the read/write unit 17. The operation of the load 22 is controlled by the logical connection between the read/write unit 17 and the load 22. By way of example, the load 22 is supplied only on condition that the external power supply 6 ensures that the read/write unit 17 is supplied as priority, i.e. when there is sufficient power available for supplying and/or operating both the read/write unit 17 and the load 22. Alternatively, it is possible for the load 22 to be supplied directly and operated directly—not under the control of the read/write unit 17. Such an example of operation would be an emergency mode for the load 22 in the event of a fault of the read/writer supply 3, in the form of an electrically driven closing apparatus being unlocked.

Loads 22 are, in particular, peripheral devices arranged in the read/writer 1 or remote therefrom, such as:
- a motor which is operated, i.e. actuated and supplied with power, by the read/writer 1 for the purpose of opening or closing a bolt on a door lock;
- an input apparatus, for example a membrane keypad, for inputting data such as an authorization code;
- a visual display apparatus, for example an LED or LCD panel;
- an audio indicator apparatus, for example a beeper as an audio signaller.

The read/writer supply 3 itself can also act as a load 22, for example when it is charged in the presence of an interconnection 7 to the external power supply 6.

FIG. 3 shows an example of the application of the apparatus according to the invention and of the method according to the invention. The closing apparatus 15 on a door 16 has a media-linked direction of entry Z from an outer region 20 into an inner region 21. Entry into the inner region 21 is possible only following successful communication with an identification medium 5 authorizing entry, whereas it is possible to exit into the outer region 20 at any time without an identification medium 5. In addition, the closing apparatus 15 is not equipped with a supplyless closing device for mechanical interaction with an entry medium, for example a mechanical lock and an associated key. If the closing apparatus 15 or the read/writer 1 is no longer operational (inoperable state), for example because a battery in the form of a read/writer supply 3 is flat and can be replaced only after entry into the inner region 21, i.e. from the inside, then it is no longer possible to replace the battery without damaging the door 16. The external power supply 6 allows the temporary emergency mode of the read/write unit 17 or of the read/writer 1, and entry, by means of the contactless interconnection 7 via the feed antenna 8 when the connection 18 between the read/writer unit 17 and the read/writer supply 3 is broken. In the temporary emergency mode, the read/writer 1 communicates with the identification medium 5 at least once, the closing apparatus 15 releases the door 16 and it is possible to enter the inner region 21 in order to replace the battery in the form of a read/writer supply 3. When the battery has been replaced, the inoperable state of the read/writer 1 or of the read/writer supply 3 is remedied and the external power supply 6 is no longer required. When the external power supply 6 is removed from the read/writer 1, the connection 18 between the read/writer 1 and the read/writer supply 3 is restored and the read/writer 1 is supplied with power by the read/writer supply 3 (proper operational state). The apparatus according to the invention and the method according to the invention eliminate the need for every single closing apparatus 15 to be connected to a supplyless closing device, to an emergency power supply or to a connection to an alternative, permanent supply, such as an emergency power system. This results in economic cost advantages as a result of a simpler design and simplified installation and maintenance of the closing apparatuses 15. Owing to the fact that there are no further connections on the closing apparatus 15 in the outer region 20, which are a potential point of attack and a security risk, security is increased. Such connections are an opening in an additional supplyless closing device (keyhole) and/or the contact points on the detachable feed antenna 8 arranged within the closing apparatus 15, for example.

A further application example is shown with the aid of a read/writer 1, in which the read/writer supply 3 is provided by an external mains supply and an emergency power supply. The apparatus according to the invention and the method according to the invention allow rescuers to operate the read/writer 1 in the event of simultaneous failure of the external mains supply and the emergency power supply, as may occur in the event of a building fire, for example.

As further variant embodiments, the antenna 2 and/or the read/writer supply 3 is/are arranged detachably or non-detachably outside the read/writer 1 or remotely from the read/writer 1; the transmission unit 8, 10 is arranged inside the read/writer 1; the read/writer supply 3 shown as a battery is in the form of a storage battery or a mains supply.

The apparatus according to the invention and the method according to the invention are also suitable for operation of a read/writer 1 with a contact-based communication link 4 to an identification medium 5.

LIST OF REFERENCE SYMBOLS

1 Read/writer
2 Antenna
3 Read/writer supply
4 Communication link
5 Identification medium
6 External power supply
7 Contactless interconnection
8 Feed antenna
9 Switching device
10 Induction coil
11 "On" switch position
12 "Off" switch position
13 Communication frequency f1
14 Supply frequency f2
15 Closing apparatus
16 Door
17 Read/write unit
18 Connection
19 Antenna unit
20 Outer region
21 Inner region
22 Load
Z Direction of entry

What is claimed is:

1. Apparatus for operating a read/writer, including an antenna and a read/write unit, for communication with an identification medium via a communication link, the apparatus comprising: a switching device provided to break a connection between a read/writer supply and the read/writer unit and wherein the switching device is set-up to break the connection between the read/writer supply and the read/writer unit when there is a contactless interconnection between an external power supply and the read/writer unit, regardless of a condition of the read/writer supply, so that for the communication with the identification medium, the read/writer is supplied by the external power supply independently of the read/writer supply.

2. Apparatus according to claim 1, wherein the contactless interconnection exists between the antenna and the external power supply.

3. Apparatus according to claim 1, wherein the read/writer comprises a feed antenna and/or an induction coil which provides the contactless interconnection to the external power supply.

4. Apparatus according to claim 1, wherein the communication link to the identification medium exists at a communication frequency f1 and the contactless interconnection exists at a supply frequency f2.

5. Apparatus according to claim 4, wherein the supply frequency f2 is an integer multiple of the communication frequency f1.

6. Apparatus according to claim 4, wherein the communication frequency f1 is an integer multiple of the supply frequency f2.

7. Apparatus according to claim 1, wherein the external power supply operates a load of the read/writer.

8. Apparatus according to claim 1, wherein the read/writer supply comprises at least one of the following supply means, namely a storage battery, a battery or a mains supply.

9. Method for operating a read/writer, including an antenna and a read/write unit, for communication with an identification medium via a communication link, the method comprising:
breaking a connection between a read/writer supply and the read/writer unit by a switching device, regardless of a condition of the read/writer supply, so that for the communication with the identification medium, the read/writer unit is supplied by the external power supply independently of the read/write supply when a contactless interconnection between an external power supply and the read/writer unit is established.

10. Method according to claim 9, wherein the antenna and the external power supply are interconnected to one another contactlessly.

11. Method according to claim 9, wherein the external power supply is interconnected in a contactless way by means of a feed antenna and/or an induction coil.

12. Method according to claim 9, wherein the communication link to the identification medium is made at a communication frequency f1 and the contactless interconnection is made at a supply frequency f2.

13. Method according to claim 12, wherein the supply frequency f2 chosen is an integer multiple of the communication frequency f1.

14. Method according to claim 12, wherein the communication frequency f1 is an integer multiple of the supply frequency f2.

15. Method according to claim 9, wherein the external power supply operates a load of the read/writer.

* * * * *

UNITED STATES PATENT AND TRADEMARK OFFICE
CERTIFICATE OF CORRECTION

PATENT NO.       : 8,544,742 B2
APPLICATION NO. : 12/444292
DATED            : October 1, 2013
INVENTOR(S)      : Hausmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this

Fifteenth Day of September, 2015

Michelle K. Lee
*Director of the United States Patent and Trademark Office*